(12) United States Patent
Sonnenschein et al.

(10) Patent No.: US 8,296,974 B2
(45) Date of Patent: Oct. 30, 2012

(54) THERMOPLASTIC POLYURETHANE CONTAINING STRUCTURAL UNITS OF POLYESTER AND POLYETHER DIOLS

(75) Inventors: Mark F. Sonnenschein, Midland, MI (US); J. Mark Cox, Lake Jackson, TX (US); Hanno R. Van der Wal, Hoek (NL); Benjamin L. Wendt, Midland, MI (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 0 days.

(21) Appl. No.: 11/991,832

(22) PCT Filed: Sep. 22, 2006

(86) PCT No.: PCT/US2006/037182
§ 371 (c)(1), (2), (4) Date: Mar. 11, 2008

(87) PCT Pub. No.: WO2007/041049
PCT Pub. Date: Apr. 12, 2007

(65) Prior Publication Data
US 2009/0149622 A1 Jun. 11, 2009

(51) Int. Cl.
*A43B 5/04* (2006.01)
*C08G 18/00* (2006.01)

(52) U.S. Cl. ............. 36/117.3; 528/49; 528/59; 528/60; 528/65; 528/66; 528/76; 528/80; 528/83; 528/85; 252/182.2; 252/182.22; 252/182.27; 36/4; 36/43; 36/73; 36/103; 36/113

(58) Field of Classification Search .................... 528/44, 528/49, 59, 60, 65, 66, 83, 76, 80; 252/182.2, 252/182.22, 182.27; 36/4, 113, 103, 43, 117.3, 73
See application file for complete search history.

(56) References Cited

U.S. PATENT DOCUMENTS

| | | | | |
|---|---|---|---|---|
| 4,124,572 A * | 11/1978 | Mao | ............... | 528/76 |
| 4,182,898 A * | 1/1980 | Fujiwara et al. | ............... | 560/26 |
| 4,379,904 A * | 4/1983 | Ehrlich et al. | ............... | 528/65 |
| 4,980,445 A * | 12/1990 | van Der wal et al. | ........... | 528/76 |
| 5,606,005 A * | 2/1997 | Oshita et al. | ............... | 528/83 |
| 5,618,904 A * | 4/1997 | Martin et al. | ............... | 528/73 |
| 5,993,972 A * | 11/1999 | Reich et al. | ............... | 428/423.1 |
| 6,734,273 B2 * | 5/2004 | Onder | ............... | 528/76 |
| 6,740,727 B2 * | 5/2004 | Plummer et al. | ............... | 528/80 |
| 6,989,406 B1 * | 1/2006 | Arntz et al. | ............... | 521/173 |
| 6,994,913 B1 * | 2/2006 | Niki et al. | ............... | 428/480 |

FOREIGN PATENT DOCUMENTS
DE 1815311 B * 11/1969
* cited by examiner

Primary Examiner — Michael L Leonard
(74) Attorney, Agent, or Firm — Christopher P. Demas

(57) ABSTRACT

The present invention is a transparent thermoplastic polyurethane (TPU) comprising structural units of: a.) a diisocyanate; b.1) a polyester diol and b.2) a specific polyether diol and c.) a chain extender. The TPU has good combinations of light transmission and clarity, tensile strength, low temperature flexibility, and high moisture vapor transition rates compared to other commercial or known TPUs. A preferred example composition is a TPU that is based on MDI as the diisocyanate monomer, polycaprolactone as a polyester diol, an EO capped EO/PO polyether diol containing less than 20% EO, and butanediol as chain extender. These composition have good combinations of clarity, tensile strength, hydrolytic stability and processability compared to TPUs prepared using either polyester or polyether diols alone or the combination with a higher EO polyether diol.

10 Claims, No Drawings

THERMOPLASTIC POLYURETHANE CONTAINING STRUCTURAL UNITS OF POLYESTER AND POLYETHER DIOLS

This invention relates to improved thermoplastic polyurethanes (TPU's) with advantageous combinations of physical properties and that are preferably elastomeric, preferably transparent and contain structural units formed from a combination of an amount of polyester diol and an amount of polyether diol having a specified oxyethylene content.

As well known in this technology area, TPU's are prepared by reacting diisocyanate compounds, polymeric diols and difunctional chain extenders. As used herein, unless otherwise limited expressly or by the context to solely the urethane products of diols and chain extenders with only hydroxyl reactive moieties, the term TPU will also refer to the somewhat less preferred thermoplastic polyurethane ureas or "TPUU's" prepared by reacting diisocyanate compounds with an amine instead of or in addition to the hydroxyl-containing chain extender compounds.

In U.S. Pat. No. 4,124,572, TPU elastomers are prepared using polyester polyols and polyether polyols containing 25 to 60 percent by weight poly(oxyethylene) to improve tensile properties and injection moldability. Nothing, however, is disclosed about the improvement of moisture resistance and optical/light transmission properties of these TPU's and it is always desirable to improve the combination of physical and optical transparency properties of TPU's including minimized water absorption and wet strength.

The present invention provides an improved thermoplastic polyurethane (TPU) comprising: a.) from about 30 to about 55 weight percent based on total TPU of hard segment comprising structural units of (i) diisocyanate and (ii) chain extender; b.) from about 45 to about 70 weight percent based on total TPU of soft segment comprising structural units of: (i) polyester diol having a molecular weight of from about 300 to about 8,000 in an amount of from about 20 to about 80 weight percent based on total weight of the TPU soft segment and (ii) poly(oxypropylene)-poly(oxyethylene) glycol polyether diol having a molecular weight of from about 500 to about 8,000 in an amount of from about 20 to about 80 weight percent based on total weight of the TPU soft segment, where the oxyethylene group content is less than 25 weight percent of the polyether diol total weight; wherein the "index" is from about 0.95 to about 1.10, and is preferably from about 0.99 to about 1.08.

In one of the preferred aspects of the present invention, the hard segment of the TPU is from about 35 to about 50 weight percent based on total TPU and in another, it comprises structural units of 4,4'-diisocyanatodiphenylmethane as the diisocyanate and 1,4-butanediol as the chain extender. In other, independent alternative preferred embodiments, the soft segment comprises from about 30 to about 70 weight percent polyester diol based on total weight of the TPU soft segment and the polyester diol is a polycaprolactone diol having a molecular weight of from about 1500 to about 3,000. In further preferred independent alternative embodiments related to the polyether diol, it has a molecular weight of from about 1,500 to about 2,500, it has oxyethylene group content of from about 5 to about 20 weight percent; and/or it is a poly(oxypropylene) glycol reacted with ethylene oxide to provide oxyethylene group blocks "capped" or "tipped" on each end of the diol.

In preferred TPU's according to the invention, the Shore A hardness is in the range of from about 60 to about 98 and more preferably in the range of from about 70 to about 90. In other embodiments, the invention is also injection molded articles (including shoe soles) or extruded films.

In the improved TPU's according to the present invention, the polyester diol component provides advantageous combinations of thermal and hydrolysis-resistance properties to provide a polymer having good part molding times, less equilibrium water absorption and thus more constant physical properties than otherwise similar TPU's based on polyester/polyether diol blends that have more EO. Also, using a polyether diol with a minimum ethylene oxide content preferably provides transparent TPUs and maintains thermal, moisture and chemical resistances, fast molding times and tensile properties similar to those obtained with diol components of only the more expensive poly(tetramethylene glycol) (PTMEG), polybutylene adipate, or polycaprolactone.

As used herein and generally in this area of technology, when TPU's are referred to as "comprising" or "containing" amounts of the reactant components or their structural unit (for example, diisocyanate, diol, and chain extender), this refers to the fact that the TPU contains the reaction product or remnant of that reactant in polymerized form.

As known to practitioners in this field, the two primary components of TPU's are referred to as the hard segment and the soft segment. The "hard segment" is the combination of the diisocyanate and chain extender components and the "soft segment" is the balance of the TPU and, in the present invention is the diol mixture component. In the TPU's according to the present invention, the hard segment preferably constitutes at least about 30 weight percent (wt %) of the polymer based on total weight of the hard and soft segments, preferably at least about 35 wt %, and more preferably at least about 40 wt %. In the TPU's according to the present invention, the hard segment desirably constitutes up to and including about 55 wt %, preferably up to and including about 50 wt %.

Diisocyanates suitable for use in preparing the hard segment of the TPU's according to this invention are well known in the art and include aromatic, aliphatic, and cycloaliphatic diisocyanates and combinations thereof. A structural unit derived from diisocyanate (—OCN—R—NCO—) is represented by the following formula:

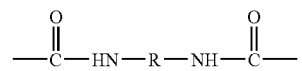

where R is an alkylene, cycloalkylene, or arylene group. Representative examples of these diisocyanates can be found in U.S. Pat. Nos. 4,385,133; 4,522,975; and 5,167,899, which teachings are incorporated herein by reference. Preferred diisocyanates include 4,4'-diisocyanatodiphenylmethane, p-phenylene diisocyanate, 1,3-bis(isocyanatomethyl)-cyclohexane, 1,4-diisocyanato-cyclohexane, hexamethylene diisocyanate, 1,5-naphthalene diisocyanate, 3,3'-dimethyl-4,4'-biphenyl diisocyanate, 4,4'-diisocyanato-dicyclohexylmethane, and 2,4-toluene diisocyanate. More preferred are 4,4'-diisocyanato-dicyclohexylmethane and 4,4'-diisocyanato-diphenylmethane. Most preferred is 4,4'-diisocyanatodiphenylmethane.

The amount of the diisocyanate to be incorporated in the TPU in total and relative to the amount of the other reactants can vary across a relatively broad range but is determined to provide (along with the chain extender) the desired overall level of hardness. The products according to this invention are characterized by preferably having a Shore A hardness in the range 60 to 98. In general, it will be preferred if the TPU has a Shore A hardness of not more than about 98, preferably of not more than about 95 and more preferably of not more than about 90. Preferably the Shore A hardness is at least about 60, preferably at least about 65, and more preferably at least about 70.

Depending upon the specific diisocyanate, diols and chain extenders according to the present invention, the amount of diisocyanate incorporated into the TPU is selected to provide the desired "index". As known to practitioners in this area, the "index" is the molar ratio of the isocyanate functional units to the sum of the isocyanate-reactive functional units (usually polyester diol plus chain extenders). For the polymers according to the present invention, this ratio is preferably at least about 0.95 parts isocyanate unit per part isocyanate-reactive units (that is, about 0.95:1 or about "0.95"), and more preferably at least about 0.99. Preferably, for the polymers according to the present invention, this ratio is up to and including about 1.10:1 ("1.10"), more preferably up to and including about 1.08, more preferably up to and including about 1.05, most preferably up to and including about 1.01. As known to those skilled this area of technology, the amount of diisocyanate to be used in preparing the TPU is then calculated knowing the desired percentage hard and soft segment, the index of the TPU and the equivalent weights of the diisocyanate, diols and chain extender(s) that are being used to prepare the compositions according to the present invention.

The other main component of the hard segment of the TPU's of the present invention is at least one chain extender, which TPU chain extenders are well know in this technology field. As is known, when the chain extender is a diol, the resulting product is a TPU, which are the preferred products according to the present invention. When the chain extender is a diamine or an amino alcohol, the resulting product is technically a TPUU.

Preferred linear chain extenders are generally diol or difunctional amine or amino alcohol compounds characterized by having a molecular weight of not more than 400 Daltons. In this context, by "linear" it is meant a chain extender compound that is not cyclic nor having alkyl chain branching from a tertiary carbon. Preferred chain extenders are represented by the following formula:

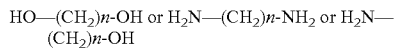

A preferred linear chain extender is 1,4-butane diol ("butane diol" or "BDO"). A BDO chain extender is represented by the following formula:

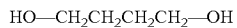

Other preferred linear chain extenders include ethlyene glycol and diethylene glycol; ethylene glycol and 1,3-propanediol; 1,6 Hexanediol; 1,5 heptane diol; or diethylene glycol or triethyleneglycol and 1,3-propanediol or a combination thereof.

Also preferred are cyclic chain extenders which are generally diol, diamine or amino alcohol compounds characterized by having a molecular weight of not more than 400 Daltons. In this context, by "cyclic" it is meant that the molecule has a 5 to 8 member ring structure with hydroxyl-alkyl branches. Cyclic chain extenders are represented by the following formulae:

HO—R-(ring)-R'—OH or HO—R—O-(ring)-O—R'—OH where R and R' are one to five carbon alkyl chains and the ring has 5 to 8 members, preferably all carbons and including such structural units where one or both of the terminal —OH's can be replaced with —NH$_2$. Suitable cyclic chain extenders include 1,4-cyclohexanedimethanol ("CHDM"), and 1,4 dihydroxycyclohexane. A preferred cyclic chain extender, CHDM, is represented by the following formula:

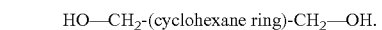

Suitable chain extenders also include aromatic chain extenders which are generally diol, diamine or amino alcohol compounds characterized by having a molecular weight of not more than 400 Daltons. In this context, by aromatic it is meant that the molecule has a 5 to 8 member unsaturated ring structure with hydroxyl-alkyl branches. Aromatic chain extenders are represented by the following formulae:

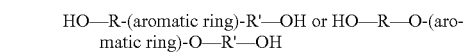

where R and R' are one to five carbon alkyl chains and the ring has 5 to 8 members, preferably all carbons and including such structural units where one or both of the terminal —OH's can be replaced with —NH$_2$. Suitable aromatic extenders include hydroquinone bis 2-hydroxyethylether (HQEE), and bisphenol-type ethoxylates, like the di-hydroxyethylether of bisphenol A.

The chain extender(s) is (are) incorporated into the TPU in amounts determined by the selection of the specific reactant components, the desired amounts of the hard and soft segments and the index sufficient to provide good mechanical properties, such as modulus and tear strength. The chain extender component can sometimes contain a minor amount (preferably less than about 10 mole percent, more preferably less than about 5 mole percent) of a higher functional reactant, such as a triol, as an impurity or for property modification purposes such as flow or processability modification. However, for the preferred TPU's according to the present invention, no higher functional chain extender is added to or contained in the chain extender(s).

The soft segment of the TPU's according to the present invention is a mixture of structural units based on polyester diol and polyether diol(s) having a specified low oxyethylene content. The polyester diol is used in preparing (and contained in) the soft segment for preferred TPU's according to the present invention in amounts of at least about 20 weight percent based on total soft segment diols (20 wt %), preferably at least about 30 wt %, more preferably at least about 40 wt %, more preferably at least about 45 wt % polyester diol based on total diol reactants used in preparing the soft segment. Such preferred TPU soft segments are generally prepared using and hence contain a polyester diol in amounts of up to and including about 80 wt %, preferably up to and including about 70 wt %, more preferably up to and including about 60 wt % and most preferably up to and including about 55 wt % polyester diol based on total amount of soft segment reactants.

Correspondingly, the polyether diol is used in preparing and contained in the preferred TPU's soft segment in amounts of at least about 20 weight percent based on total soft segment diols (20 wt %), preferably at least about 30 wt %, more preferably at least about 40 wt %, and most preferably at least about 45 wt % polyether diol. Such preferred TPU's have a soft segment prepared from and containing a polyether diol in amounts of up to and including about 80 wt %, preferably up to and including about 70 wt %, more preferably up to and including about 60 wt % and most preferably up to and including about 55 wt % polyether diol.

The polyester diols used in making thermoplastic polyurethanes are well known in the art and require no detailed description here. The suitable polyester diols include the groups of diols referred to as aliphatic polyester diols, polycaprolactone diols and aromatic polyester diols. Polyester diols suited for use in the TPU's of the present invention are commercially available and can also be prepared for specific combinations of costs and properties by known techniques.

It will be understood that they include chain extended polyesters made from a glycol (for example, ethylene and/or propylene glycol) and a saturated dicarboxylic acid (for example, adipic acid as well as polycaprolactonediols). By way of non-limiting example there may be mentioned poly (ethylene adipate) glycol, poly(propylene adipate) glycol, poly(butylene adipate) glycol, poly(neopentyl sebacate) glycol, etc.

Suitable polyester diols include those obtainable by reacting such diols as 1,4-butanediol, hydroquinone bis(2-hydroxyethyl)ether, ethylene glycol, diethylene glycol, triethylene glycol, propylene glycol, dipropylene glycol, 2-methyl-2-ethyl-1,3 propanediol, 2-ethyl-1,3-hexanediol, 1,5-pentanediol, thiodiglycol, 1,3-propanediol, 1,3-butanediol, 2,3-butanediol, neopentyl glycol, 1,2-dimethyl-1,2-cyclopentanediol, 1,2-cyclohexanediol, 1,2-dimethyl -1,2-cyclohexanediol, glycerol, trimethylol propane, trimethylol ethane, 1,2,4-butanetriol, 1,2,6-hexanetriol, pentaerythritol, dipentaerythritol, tripentaerythritol, anhydroaneaheptitol, mannitol, sorbitol, methyl-glucoside, and the like with such dicarboxylic acids as adipic acid, succinic acid, glutaric acid, azelaic acid, sebacic acid, malonic acid, maleic acid, fumaric acid, phthalic acid, isophthalic acid, terephthalic acid, tetrachlotophthalic acid and chlorendic acid; the acid anhydrides, alkyl esters and acid halides of these acids may also be used.

The suitable polyester diols typically have a molecular weight of at least about 300, preferably at least about 500, more preferably at least about 1,000 and more preferably at least about 1,500 and most preferably at least about 1,800 Daltons, and preferably not greater than 8,000, more preferably not greater than 5,000, more preferably not greater than 3,000 and most preferably not greater than 2,500 Daltons and most preferably have a molecular weight of about 2000.

A preferred polyester diol is a polycaprolactone ("PCL") diol. The structural units resulting from PCL diols suitable for use in preparing the TPU's according to the present invention are preferably represented by the following general formula:

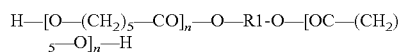

where each n is independently from about 3 to about 90, R1 is an alkyl, aryl or (poly-) ether type of radical, with a molecular weight of less than 1000 Da.

The molecular weight of the PCL is preferably at least 500, more preferably at least 1,000 and more preferably at least 1,500 and most preferably at least about 1,800 Daltons, and preferably not greater than 8,000, more preferably not greater than 5,000, more preferably not greater than 3,000 and most preferably not greater than 2,500 Daltons. These PCL diols are generally well known in the industry and commercially available PCL's include the "Tone" brand commercial polycaprolactone diols commercially available from The Dow Chemical Company.

The known adipate types of polyester diols are also suitable for use in preparing the TPU's according to the present invention. Preferred adipate diols are represented by the following general formula:

where n is from about 2 to about 40, and $R_2$ represents the structural unit(s) from one or more diol(s) (including blends of two or more) such as 1,4-butane diol used to prepare the diol.

The molecular weight of the adipate diol is preferably at least 300, more preferably at least 600, more preferably at least 1000 Daltons, more preferably at least about 1,500 and most preferably at least about 1,800, and preferably not greater than 8,000, more preferably not greater than 5000, and most preferably not greater than 3000 Daltons. Examples of commercially available adipate diols include the grades of Fomrez brand adipate diol produced by Crompton such as Fomrez 44-56 or Fomrez 44-57.

The polyether diols preferred for use in preparing the TPU's according to the present invention are the poly(oxypropylene)-poly(oxyethylene) glycols which are also referred to as propylene oxide/ethylene oxide diols or "EO-PO" diols. These polyether diols are well known for preparation of polyurethanes and many suitable types of these polyether diols area commercially available.

Poly(oxypropylene)-poly(oxyethylene) glycols suitable for use in the compositions according to the present invention can be either: (1) a "capped" or "tipped" diol in which a poly(oxypropylene) glycol is reacted further with ethylene oxide giving rise to oxyethylene group blocks on each end of the diol- or (2) a more random poly (oxypropylene)-poly (oxyethylene) glycol in which the propylene oxide and ethylene oxide reactants are introduced together or in alternating portions. The preparation of both types of diols is described in "Polyurethanes: Chemistry and Technology," Part 1. Chemistry, by J. H. Saunders and K. C. Frisch, Interscience, New York, 1962, pp. 36-37. The technique of tipping is further described in "Advances in Urethane Science and Technology" by K. C. Frisch and S. L. Reegan, Technomic Publishing Company, Westport, Conn. 1973, pp. 188-193. The molecular weight of the polyether diol is generally at least about 500, preferably at least about 1,000, more preferably at least about 1,500 and most preferably at least about 1,800 Daltons, and preferably not greater than about 8,000, more preferably not greater than about 5,000, more preferably not greater than about 3,000 and most preferably not greater than about 2,500 Daltons.

It has been found that it is important for balance of properties and especially in reducing the moisture absorption of the TPU, for the oxyethylene group content of the polyether diol to be less than about 25 weight percent of the polyether diol total weight (<25 wt %) and preferably to be less than or equal to about 20%, with the lower levels being preferred for the lower molecular weight diols. For a 2000 molecular weight diol the preferred oxyethylene group content is at least about 5 wt %, preferably at least about 10 wt %, and more preferably at least about 12 wt %.

As known to those practicing in the area of TPU's, the diols used as the soft segment component can sometimes contain minor amounts (preferably less than about 10 mole percent, more preferably less than about 5 mole percent) of a higher functional polyol, such as a triol, as an impurity or for property modification purposes such as flow or processability modification. However, for the preferred TPU's according to the present invention, no higher functional polyol is added to or contained in the soft segment.

A catalyst may or may not be used as desired. Some examples of useful catalysts are N-methyl-morpholine, N-ethyl-morpholine, triethyl amine, triethylene diamine (Dabco), N,N'-bis(2-hydroxylpropyl)-2-methyl piperazine, dimethyl ethanol amine tertiary amino alcohols, tertiary ester amines, stannous octoate, dibutyl tin dilaurate and the like.

As also known to practitioners in this area, minor amounts of chain terminator(s) or chain stopper(s) can be employed in the preparation of the TPU products according to the present invention. Preferred chain stoppers include monohydric alcohols, including but not limited to stearyl alcohol and butyl carbitol (2-(2-Butoxyethoxy)ethanol). These are used in very low concentrations of from about 0.0005 to about 0.05 equivalents per equivalent of diisocyanate. See also the chain terminating teachings of U.S. Pat. Nos. 3,761,439 and 4,098,772 which are incorporated herein by reference.

The TPU can be manufactured by processes commonly used to make these polymers. The TPU product can be prepared by reactive extrusion and other methods known generally to those skilled in the art. The preferred TPU is prepared from starting materials in amounts as prescribed above and effective to produce an extrudable or injection moldable TPU preferably elastomeric and preferably having a $T_g$ of less than about 25 C, preferably less than 10 C, and more preferably less than 0 C. As used herein, the Tg is measured by an Advanced Rheometric Expansion System ("ARES") via a dynamic temperature step (DTS) test. The DTS should be performed in parallel plate geometry from −50 C to 180 C with temperature steps of 5 C and a soak time of 30 seconds. In this test an acceptable strain for individual materials should be determined from within the linear region for stress and strain via a strain sweep test and the frequency should be about 1.0 rad/s.

The TPU of the present invention is useful, for example, in exterior parts of footwear and other applications where modulus, abrasion resistance, toughness and retention of properties in moist or wet conditions are important as in coating, a film, or a sealant, as well as in a variety of articles including cast articles, injection molded articles, and extruded articles, such as films or sheets for stamping, cutting, molding and/or thermoforming into articles such as shoe soles and other footwear applications, hose jacketing, tubing, castor wheels, and as a barrier layer for hospital gowns.

The following experimental compositions are for illustrative purposes only and are not intended to limit the scope of this invention. All percentages are in weight percent unless otherwise noted.

Unless expressly stated otherwise, in the following Experiments, the following materials listed as a(i) through c below were the ones used to prepare the experimental compositions according to the procedures described below and summarized in the following Tables:

a(i) MDI—4,4'-diisocyanatodiphenylmethane, obtained as ISONATE 125M MDI (a trademark of The Dow Chemical Company).

a(ii) Chain Extender—butane diol ("BDO")-1,4-butanediol obtained from BASF Corporation.

b.1) Polyester diol—polycaprolactone diol ("PCL") is prepared by the condensation reaction of s-caprolactone and having a molecular weight of 2,000.

b.2) Polyether diol—2000 molecular weight polypropyleneoxide-b-polyethyleneoxide polyether diol (12% EO as a "cap" or "tip").

c) Catalyst—stannous octoate obtained as Dabco T-9 from Air Products & Chemicals, Inc Experiments 1 through 3

MDI was kept in a freezer until use (to minimize dimer formation) and allowed to come to room temperature under dry conditions. All other materials were dried prior to use in a heated vacuum oven. Laboratory syntheses were performed in a Haake dispersive mixer (70 cc mixing bowl) with the viscosity of the reacting ingredients measured by a calibrated torque measurement device. Stoichiometry was strictly followed with a 5% equivalence excess of MDI. MDI was added to a mixer heated to 110° C. and the MDI allowed to melt. The diol or blend of diols was then slowly added to the MDI with agitation (~40 rpm) along with a small amount of catalyst. The mixer was then heated under nitrogen to 150° C. and allowed to mix while the prepolymer reaction between MDI and diol was allowed to complete. At the end of this period no torque increase was measured indicating that chain extension of the urethane polymer had not occurred to any significant extent. The polymer was completed by slowly adding the BDO chain extender to the pre-polymer under continued mixing. At that point the torque measured in the mixer quickly increases as the viscosity of the forming polymer would rapidly climb. The sample is then heated with rapid mixing (~120 rpm) until the measured torque falls to near zero indicating randomization of the hard segment length, usually between 180 and 210 C. Following this, the material was allowed to cool under moderate mixing conditions until the measured torque in the mixer increased significantly, generally to at least about 6 newton-meters, indicating that the TPU has undergone very substantial recombination and molecular weight re-building.

The resulting polymer was subsequently cut into small pieces, dried, compression molded, and then equilibrated at room temperature for at least 48 hours. The Table below summarizes the compositions of the experimental polymers and the results from their evaluation. The tensile testing of these samples and the other Experimental Compositions for Modulus, Stress at Break, Segment Modulus, Toughness and Elongation at Break was performed on an Instron tensile testing machine and analyzed using Series 9 or Merlin software supplied by the manufacturer. The testing for Shore hardness was performed on a durometer. The Tg, where measured, is measured by an Advanced Rheometric Expansion System ("ARES") via a dynamic temperature step (DTS) test performed in parallel plate geometry from −50 C to 180 C with temperature steps of 5 C and a soak time of 30 seconds. An acceptable strain for individual materials was determined from within the linear region for stress and strain via a strain sweep test and the frequency was about 1.0 rad/s.

In these and following tables and experiments, the amounts of reactant components shown are the indicated percentages of reactants used to make the material and which result in generally the same proportional amount of the reactant or structural unit being incorporated in the polymer.

|  | Composition No. | | |
| --- | --- | --- | --- |
|  | 1 | 2 | 3 |
| Wt % Hard Segment | 35 | 40 | 45 |
| Wt % Soft Segment | 65 | 60 | 55 |
| Polyester diol wt % (based on total soft segment) | 50% | 50% | 50% |
| Mol Wt | 2,000 | 2,000 | 2,000 |
| Polyether diol wt % (based on total soft segment) | 50% | 50% | 50% |
| Mol Wt | 2,000 | 2,000 | 2,000 |
| EO % | 12% Cap | 12% Cap | 12% Cap |
| Index | 1.05:1 | 1.05:1 | 1.05:1 |
| Modulus (psi) | 432 | 535 | 785 |
| Elongation @ break % | 1600 | 1720 | 1400 |
| Toughness (psi) | 33,800 | 41,300 | 38,200 |
| Shore A Hardness | 86 | 90 | 95 |
| Tg |  |  | −25 C. |

Compositions 4-9

The following compositions were prepared by the procedure used for experimental compositions 1-3 above. In these compositions the relative proportions of two diol components are varied.

|  | Composition No. | | | | | |
| --- | --- | --- | --- | --- | --- | --- |
|  | 4* | 5* | 6 | 7 | 8 | 9* |
| Wt % Hard Segment | 40 | 40 | 40 | 40 | 40 | 40 |
| Wt % Soft Segment | 60 | 60 | 60 | 60 | 60 | 60 |
| Polyester diol wt % | 0 | 15 | 30 | 40 | 50 | 100 |
| Mol Wt | 2,000 | 2,000 | 2,000 | 2,000 | 2,000 | 2,000 |
| Polyether diol wt % | 100% | 85% | 70% | 60 | 50 | 0 |
| Mol Wt | 2,000 | 2,000 | 2,000 | 2,000 | 2,000 | 2,000 |
| EO % | 12% Cap | 12% Cap | 12% Cap | 12% Cap | 12% Cap | 12% Cap |
| Index | 1.05:1 | 1.05:1 | 1.05:1 | 1.05:1 | 1.05:1 | 1.05:1 |
| Modulus (psi) | 880 | 930 | 1800 | 1830 | 2420 | 900 |
| Stress @ break (psi) | 215 | 350 | 930 | 1860 | 3300 | 3500 |
| Toughness (psi) | 100 | 825 | 2700 | 8350 | 12000 | 12000 |
| Tg |  |  | −30 C. | −29 C. |  |  |

*Comparative Composition - not an example of the present invention.

Compositions 10-13

The following experimental compositions were prepared in the same general manner as the previous experimental compositions except that the amount of the MDI/BDO hard segment is varied and the polyether diol is a 1000 molecular weight 20% EO capped polypropylene oxide diol. These experimental compositions show that very good elastomers can be produced using a polyether diol that is a polypropylene oxide diol with a cap of 20% oxyethylene.

|  | Composition No. | | | |
| --- | --- | --- | --- | --- |
|  | 10 | 11 | 12 | 13 |
| Wt % Hard Segment | 35 | 40 | 45 | 50 |
| Wt % Soft Segment | 65 | 60 | 55 | 50 |
| Polyester diol wt % | 50 | 50 | 50 | 50 |
| Mol Wt | 2,000 | 2,000 | 2,000 | 2,000 |
| Polyether diol wt % | 50 | 50 | 50 | 50 |
| Mol Wt | 1,000 | 1,000 | 1,000 | 1,000 |
| EO % | 20% Cap | 20% Cap | 20% Cap | 20% Cap |
| Index | 1.05:1 | 1.05:1 | 1.05:1 | 1.05:1 |
| Elongation to break (%) | 1080 | 1230 | 565 | 600 |
| Stress @ break (psi) | 500 | 1400 | 1300 | 2700 |
| Toughness (psi) | 3300 | 9500 | 5000 | 10700 |
| Shore A Hardness | 61 | 71 | 84 | 90 |

Water Absorption Experiments

The following experiments compare the water absorption of a TPU elastomer according to the invention to that of an otherwise comparable TPU except that it is made with a higher EO content polyether diol. Composition 1 from above (35% Hard Segment, 50/50 polyether/polyester blend) is compared with an experimental material (Composition No. 14) of about the same Shore A hardness value but made with an EO-PO polyether diol (2,000 molecular weight and 40% EO cap). The experimental method used was ASTM D 570-98, a standard test method for evaluating the water absorption of plastics during long term immersion in deionized water at 25° C. The plastic sample to be tested is immersed in deionized water at 25° C. until equilibrium and the weight is not changing with increasing further immersion time. The water weight gains of the materials are measured and shown in the Table below. As shown, the composition according to the invention had less water absorption and lower equilibrium water content than the comparative TPU made with the higher EO content, capped polyether diol. This results in improved properties under high humidity or wet conditions which can be very important for most applications for TPU products.

|  | Composition 1 (with 12% EO Capped PO Diol) | | Comparative Composition 14* (with 40% EO Capped PO Diol) | |
| --- | --- | --- | --- | --- |
| Hours | Weight (grams) | % gain | Weight (grams) | % gain |
| 0 | 15.828 |  | 13.446 |  |
| 24 | 16.089 | 1.6 | 15.710 | 16.8 |
| 96 | 16.103 | 1.7 | 16.453 | 22.3 |

*Comparative Composition - not an example of the present invention.

The tensile properties of these materials after immersion are then tested and the results are shown in the table below. In the table "dry" is considered to be after the plastic has been maintained under the ASTM conditioning conditions and "saturated" refers to the conditions after the plastic has been immersed in the deionized water at 25° C. and the weight gain is not changing with increasing immersion time. The data show that the material according to the present invention retained its physical properties much better than the comparative material.

|  | Composition 1 | | | | Comparative Composition 14* | | | |
| --- | --- | --- | --- | --- | --- | --- | --- | --- |
|  | Elongation @ break (%) | Toughness (psi) | Break stress (psi) | Shore A | Elongation @ break (%) | Toughness (psi) | Break stress (psi) | Shore A |
| Dry | 2550 | 77400 | 7000 | 84 | 1940 | 49,300 | 5300 | 85 |
| Saturated | 2520 | 56200 | 4800 | 82 | 1750 | 24200 | 2500 | 67 |
| % Property Retention | 99 | 73 | 69 | 97.5 | 90 | 53 | 47 | 79 |

*Comparative Composition - not an example of the present invention.

Experimental Compositions 15-16

These experimental compositions compare the properties of an elastomer of the current invention with a comparative elastomer made with a diol capped with higher amounts of EO. Polymers are prepared generally according to the process shown for Compositions 1-3 above to obtain the Compositions shown as 15 and 16 in the table below. As can be seen, 15 is a 50% MDI-BDO hard segment material made with a 50%/50% (weight) blend of 1000 molecular weight 20% EO capped polypropylene oxide and 2000 molecular weight polycaprolactone. Experimental Composition 16 is a similar hard segment material made with a 50%/50% (weight) blend of 1000 molecular weight 40% EO capped polypropylene oxide and 2000 molecular weight polycaprolactone. This data shows that the elastomers of the present invention have superior tensile properties to the comparative material, particularly in terms of its modulus or stiffness property.

|  | Composition No. | |
| --- | --- | --- |
|  | 15 | 16* |
| Wt % Hard Segment | 50 | 50 |
| Wt % Soft Segment | 50 | 50 |
| Polyester diol wt % | 50 | 50 |
| Mol Wt | 2,000 | 2,000 |
| Polyether diol wt % | 50 | 50 |
| Mol Wt | 1,000 | 1,000 |
| EO % | 20% Cap | 40% Cap |
| Index | 1.05:1 | 1.05:1 |
| Elongation to break (%) | 710 | 825 |
| Segment modulus (psi @100%) | 328 | 287 |
| Modulus(psi) | 4560 | 2547 |
| Shore A Hardness | 93 | 94 |

The data shown above demonstrate the surprisingly optimized effect of the combination of polyester and polyether diols.

The invention claimed is:

1. An improved thermoplastic polyurethane (TPU) molded shoe sole comprising:
   a. from about 30 to about 55 weight percent based on total TPU of hard segment comprising structural units of (i) diisocyanate and (ii) chain extender;
   b. from 45 to about 70 weight percent based on total TPU of soft segment comprising structural units of:
      (i) polycaprolactone diol having a molecular weight of from about 300 to about 8,000 in an amount of from about 20 to about 80 weight percent based on total weight of the TPU soft segment and
      (ii) poly(oxypropylene)-poly(oxyethylene) glycol polyether diol having a molecular weight of from about 1,500 to about 3,000 in an amount of from about 20 to about 80 weight percent based on total weight of the TPU soft segment, where the oxyethylene group content is less than 25 weight percent of the polyether diol total weight;
   wherein the "index" is from about 0.95 to about 1.10, and wherein the molded shoe sole has a Shore A hardness in the range of from about 60 to about 98.

2. An improved thermoplastic polyurethane (TPU) molded shoe sole according to claim 1 comprising soft segment comprising structural units of:
   (i) from about 30 to about 70 weight percent polycaprolactone diol based on total weight of the TPU soft segment and
   (ii) from about 30 to about 70 weight percent poly(oxypropylene)-poly(oxyethylene) glycol polyether diol based on total weight of the TPU soft segment.

3. An improved thermoplastic polyurethane (TPU) molded shoe sole according to claim 2 where the polycaprolactone diol has a molecular weight of from about 1500 to about 3,000.

4. An improved thermoplastic polyurethane (TPU) molded shoe sole according to claim 2 where the oxyethylene group content in the polyether diol is from about 5 to about 20 weight percent of the polyether diol total weight.

5. An improved thermoplastic polyurethane (TPU) molded shoe sole according to claim 2 where the polyether diol has a molecular weight of from about 1,500 to about 2,500.

6. An improved thermoplastic polyurethane (TPU) molded shoe sole according to claim 2 comprising from about 35 to about 50 weight percent hard segment based on total TPU.

7. An improved thermoplastic polyurethane (TPU) molded shoe sole according to claim 6 comprising structural units of 4,4'-diisocyanatodiphenylmethane as the diisocyanate and 1,4-butanediol as the chain extender.

8. An improved thermoplastic polyurethane (TPU) molded shoe sole according to claim 1 wherein the poly(oxypropylene)-poly(oxyethylene) glycol polyether diol is a poly(oxypropylene) glycol reacted with ethylene oxide to provide oxyethylene group blocks "capped" or "tipped" on each end of the diol.

9. An improved thermoplastic polyurethane (TPU) molded shoe sole according to claim 1 wherein the "index" is from about 0.99 to about 1.08.

10. An improved thermoplastic polyurethane (TPU) molded shoe sole according to claim 1 having a Shore A hardness in the range of from about 70 to about 90.

* * * * *